Patented Aug. 23, 1932

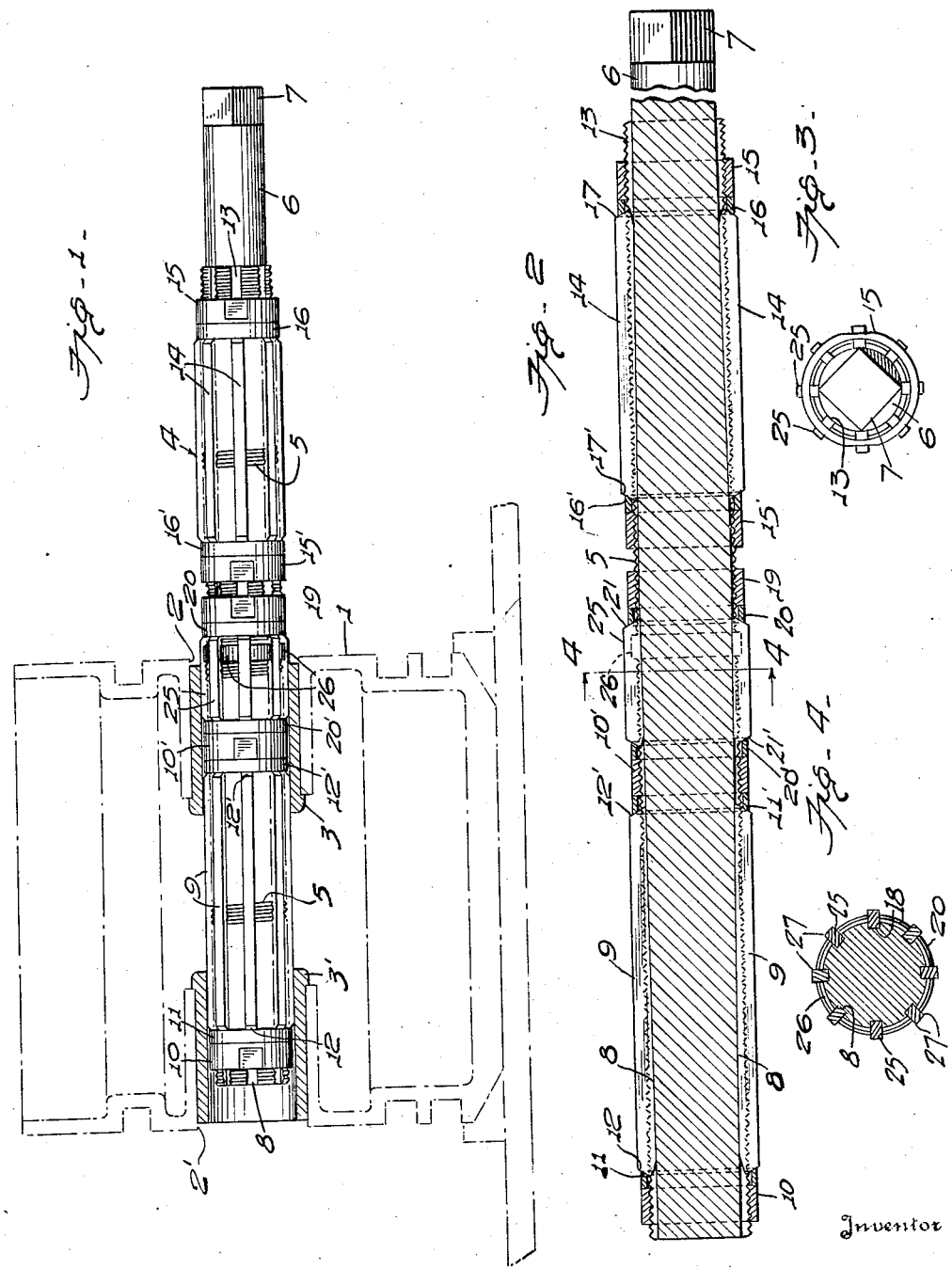

1,873,177

UNITED STATES PATENT OFFICE

LAWRENCE O. BEARD, OF LANCASTER, PENNSYLVANIA

REAMER

Application filed March 25, 1931. Serial No. 525,273.

My invention relates to reamers and more particularly to that class of reamers adapted for truing the piston pin bores of internal combustion engine pistons.

The principal object of the invention is to provide a plurality of adjustable pilot members or blades at each end of the reamer to eliminate chattering and to insure getting the piston pin hole on one side of the piston in true alinement with the opposing hole.

Another object is to provide the front pilot blades and the cutting blades with adjusting means, common to both sets of blades, so that the relative diameters of the pilot blades will remain constant to that of the cutting blades after leaving the factory.

Other and more specific objects and advantages of the invention will be apparent as the specification is considered in connection with the accompanying drawing; in which Figure 1 is a side elevation of a reamer embodying the invention, and shows also in dotted lines and partly in section a piston to which the reamer is applied;

Figure 2 is a longitudinal section through the reamer;

Figure 3 is an end view; and

Figure 4 is a section on the line 4—4 of Figure 2.

Referring more particularly to the drawing wherein the same reference characters indicate like parts in all the figures, 1 represents the piston of an internal combustion engine, provided with the usual diametrically opposed piston pin holes or bores 2 and 2' and also provided with bushings 3 and 3' respectively, which require truing from time to time by means of a reamer 4 or other suitable tool.

The reamer 4 is threaded throughout its entire length as at 5, with the exception of the smooth shank portion 6, the latter being formed with a shouldered handle portion, as at 7, to receive a crank or other operating tool (not shown). A plurality of circumferentially spaced parallel longitudinal slots or channels 8 formed in the forward end of the threaded portion 5, are adapted to slidably receive forward pilot members or blades 9 which are similar to the usual cutting blades 25, hereinafter referred to, with the exception that the pilot blades have smooth bearing faces, whereas the blades 25 have the sharp cutting faces or edges 27. The pilot members 9 are held in adjusted position in the slots 8 by means of opposing lock nuts 10—10' which force the beveled washers 11—11' into engagement with the beveled end portions 12—12' of the blades. Proper adjustment of the blades may be had by slightly unscrewing one of the nuts 10—10' and screwing up the opposing nut.

A second group of circumferentially spaced parallel slots 13 are formed in the rear end portion of the reamer in longitudinal alinement with the forward slots 8, for slidably receiving rear or outer pilot blades or members 14, identical in construction to the forward pilot blades 9. The pilot members 14 are held in adjusted position in their slots 13 by means of lock nuts 15—15' which cooperate with beveled washers 16—16' and normally hold the latter in contact with the beveled end portions 17—17' of the rear pilot blades. Adjustment of the rear blades 14 to the desired expanded or contracted position may be had by unscrewing one of the nuts 15—15' and screwing up the opposing nut.

Interposed between the two groups of front and rear pilot blade slots 8 and 13 respectively are a plurality of short spaced parallel cutting blade slots 18, longitudinally aligned with and similar in number to the pilot blade slots. These slots 18 slidably receive the cutting blades 25, previously referred to, the latter being held in adjusted position by lock nuts 19 and 10' which advance beveled washers 20 and 20' into engagement with the beveled end portions 21—21' of the cutting blades, when the lock nuts are screwed in appropriate directions. It will be noted that the lock nut 10' is common to the forward pilot blades 9, cutting blades 25 and washers 11'—20'. Consequently the adjustment of the forward set of pilot blades cannot be altered without also necessitating adjustment of the cutting blades to correspond. This simultaneous adjustment feature is important because these two sets of blades are adjusted to their proper relative diameters before the reamer leaves the factory and it is essential that this relation remain fixed. The diameter of the front pilot blades should always remain about five one thousandths of an inch less than the diameter of the cutting blades, and this necessarily follows where one cannot be adjusted without making a compensating adjustment of the other. It will be understood that the cutting blades and the forward and rear pilot blades as well as their slots are of corresponding depth and that the bottoms of the various slots are inclined relatively and uniformly to the axis of the reamer, as illustrated in Figure 2, to permit of uniform expansion and contraction of the blades, when the adjusting nuts are appropriately manipulated.

The reamer 4, just described is inserted in the bores 2—2' of the piston 1, in the order named, until the forward pilot blades 9 have passed partially through the bushing 3' and the inclined cutting blades 25 engage the bushing 3, it being understood that the piston will preferably be clamped in a suitable vise, not shown, during the reaming operation. The reamer is then rotated by means of a crank or other suitable tool, not shown, connected to the shouldered end portion 7. When the bushing 3 has been reamed the reamer is advanced until the bushing 3' is reamed, during which operation the reamer is piloted by the front and rear pilot blades successively engaging the bushing 3, it being understood that the rear pilot blades 14 will always be adjusted by the operator to the exact diameter of the cutting blades 25. An enlarged portion or collar 26 formed on the cutting blade receiving portion of the reamer steadies and braces the cutting blades.

From the foregoing it will be noted that the reamer is piloted or centered by a plurality of contact or bearing blades positioned close to the cutting blades at either end thereof, thus eliminating chattering; and that the relative normal diameter of the forward pilot members and the cutting blades will always remain fixed, thus insuring accurate centering or piloting.

Having thus described my invention:
What I claim is:
A reamer for truing opposing piston pin holes and the like comprising a shank having longitudinal slots therein, a set of forward pilot blades and a set of rear pilot blades mounted in said slots, a set of cutting blades mounted in said slots adjacent the opposing ends of the forward and rear pilot blades, the bottoms of said slots being inclined relatively and uniformly to the axis of the reamer to permit uniform expansion and contraction of the blades when the latter are moved longitudinally of said slots, said cutting blades being in longitudinal alinement with said pilot blades, means common to the front pilot blades and the cutting blades for moving the same in said slots, and independent means for moving the rear pilot blades in said slots, the relative length and proximity of the cutter blades with respect to the pilot blades being such that the rear pilot blades will function to guide the cutting blades through both holes being reamed.

In testimony whereof I affix my signature.
LAWRENCE O. BEARD.